United States Patent
Kramer et al.

(10) Patent No.: US 10,941,937 B2
(45) Date of Patent: Mar. 9, 2021

(54) COMBUSTOR LINER WITH GASKET FOR GAS TURBINE ENGINE

(71) Applicant: UNITED TECHNOLOGIES CORPORATION, Farmington, CT (US)

(72) Inventors: Stephen K. Kramer, Cromwell, CT (US); Jose E. Ruberte Sanchez, Jupiter, FL (US)

(73) Assignee: Raytheon Technologies Corporation, Farmington, CT (US)

( * ) Notice: Subject to any disclaimer, the term of this patent is extended or adjusted under 35 U.S.C. 154(b) by 1054 days.

(21) Appl. No.: 15/463,168

(22) Filed: Mar. 20, 2017

(65) Prior Publication Data

US 2018/0266689 A1    Sep. 20, 2018

(51) Int. Cl.
*F23R 3/06*     (2006.01)
*F23R 3/00*     (2006.01)
(Continued)

(52) U.S. Cl.
CPC .............. *F23R 3/06* (2013.01); *F02C 7/12* (2013.01); *F23R 3/002* (2013.01); *F23R 3/50* (2013.01); *F23R 3/60* (2013.01); *F05D 2260/201* (2013.01); *F05D 2260/202* (2013.01); *F23R 2900/00012* (2013.01); *F23R 2900/03041* (2013.01); *F23R 2900/03042* (2013.01);
(Continued)

(58) Field of Classification Search
CPC .... F23R 3/06; F23R 3/002; F23R 3/50; F23R 3/60; F23R 2900/00012; F23R 2900/03041; F23R 2900/03042; F23R 2900/03043; F23R 2900/03044; F02C 7/12; F05D 2260/201; F05D 2260/202; Y02T 50/675
See application file for complete search history.

(56) References Cited

U.S. PATENT DOCUMENTS 3,965,066 A    6/1976  Sterman
4,030,875 A *  6/1977  Grondahl ............... F23R 3/007
                                                      60/753
(Continued)

FOREIGN PATENT DOCUMENTS

EP    1507116 A1    2/2005
EP    3211319 A1    8/2017
(Continued)

OTHER PUBLICATIONS

U.S.Non-Final Office Action dated Sep. 12, 2019 for corresponding U.S. Appl. No. 15/440,760.
(Continued)

*Primary Examiner* — Arun Goyal
*Assistant Examiner* — Henry Ng
(74) *Attorney, Agent, or Firm* — Bachman & LaPointe, P.C.

(57) ABSTRACT

A gasket for installation within a cavity between a support shell and a liner panel of a combustor wall assembly, the support shell having a multiple of impingement holes, and the liner panel having a multiple of film holes, the gasket including a multiple of cells arranged with respect to the multiple of impingement holes and the multiple of film holes, wherein at least one of the multiple of cells segregate a respective subset of the multiple of impingement holes and a subset of the multiple of film holes.

9 Claims, 10 Drawing Sheets

(51) Int. Cl.
*F23R 3/60* (2006.01)
*F02C 7/12* (2006.01)
*F23R 3/50* (2006.01)

(52) U.S. Cl.
CPC .............. *F23R 2900/03043* (2013.01); *F23R 2900/03044* (2013.01); *Y02T 50/675* (2013.01)

(56) References Cited

U.S. PATENT DOCUMENTS

| | | | |
|---|---|---|---|
| 4,253,301 | A | 3/1981 | Vogt |
| 4,567,730 | A | 2/1986 | Scott |
| 4,614,082 | A | 9/1986 | Sterman et al. |
| 4,655,044 | A | 4/1987 | Dierberger et al. |
| 4,776,790 | A | 10/1988 | Woodruff |
| 4,944,151 | A | 7/1990 | Hovnanian |
| 5,333,433 | A | 8/1994 | Porambo et al. |
| 5,363,643 | A | 11/1994 | Halila |
| 5,419,115 | A | 5/1995 | Butler et al. |
| 5,956,955 | A | 9/1999 | Schmid |
| 5,996,335 | A | 12/1999 | Ebel |
| 6,029,455 | A | 2/2000 | Sandelis |
| 6,276,142 | B1 | 8/2001 | Putz |
| 6,497,105 | B1 | 12/2002 | Stastny |
| 6,675,586 | B2 | 1/2004 | Maghon |
| 6,901,757 | B2 | 6/2005 | Gerendas |
| 7,021,061 | B2 | 4/2006 | Tiemann |
| 7,089,748 | B2 | 8/2006 | Tiemann |
| 7,299,622 | B2 | 11/2007 | Häggander |
| 7,464,554 | B2 | 12/2008 | Cheung et al. |
| 7,677,044 | B2 | 3/2010 | Barbeln et al. |
| 7,770,398 | B2 | 8/2010 | De Sousa et al. |
| 7,900,461 | B2 | 3/2011 | Varney et al. |
| 8,104,287 | B2 | 1/2012 | Fischer et al. |
| 8,266,914 | B2 | 9/2012 | Hawie et al. |
| 8,418,470 | B2 | 4/2013 | Burd |
| 8,661,826 | B2 | 3/2014 | Garry et al. |
| 8,683,806 | B2 | 4/2014 | Commaret et al. |
| 8,984,896 | B2 | 3/2015 | Davenport et al. |
| 10,215,411 | B2 | 2/2019 | Tu et al. |
| 2001/0029738 | A1 | 10/2001 | Pidcock et al. |
| 2004/0182085 | A1 | 9/2004 | Jeppel et al. |
| 2005/0150632 | A1* | 7/2005 | Mayer ............... F01D 25/08 165/47 |
| 2006/0053798 | A1* | 3/2006 | Hadder ............... F23R 3/007 60/772 |
| 2008/0115499 | A1 | 5/2008 | Patel et al. |
| 2008/0282703 | A1 | 11/2008 | Morenko et al. |
| 2009/0077974 | A1 | 3/2009 | Dahlke et al. |
| 2009/0199837 | A1 | 8/2009 | Tschirren et al. |
| 2011/0185739 | A1 | 8/2011 | Bronson et al. |
| 2011/0185740 | A1 | 8/2011 | Dierberger et al. |
| 2012/0272521 | A1* | 11/2012 | Lee ............... B21K 3/00 29/888.01 |
| 2013/0180252 | A1 | 7/2013 | Chen |
| 2014/0033723 | A1* | 2/2014 | Doerr ............... F23R 3/007 60/737 |
| 2014/0202163 | A1 | 7/2014 | Johnson et al. |
| 2014/0360196 | A1 | 12/2014 | Graves et al. |
| 2015/0330633 | A1 | 11/2015 | Graves et al. |
| 2016/0054001 | A1 | 2/2016 | Bangerter et al. |
| 2016/0061448 | A1 | 3/2016 | Davenport et al. |
| 2016/0123594 | A1 | 5/2016 | Cunha et al. |
| 2016/0201909 | A1 | 7/2016 | Bangerter et al. |
| 2016/0201914 | A1 | 7/2016 | Drake |
| 2016/0230996 | A1 | 8/2016 | Kostka et al. |
| 2016/0238247 | A1 | 8/2016 | Stauffer |
| 2016/0252249 | A1 | 9/2016 | Erbas-Sen et al. |
| 2016/0258626 | A1 | 9/2016 | Moura et al. |
| 2016/0265772 | A1 | 9/2016 | Eastwood et al. |
| 2016/0265784 | A1 | 9/2016 | Bangerter et al. |
| 2016/0273772 | A1 | 9/2016 | Cunha et al. |
| 2016/0377296 | A1 | 12/2016 | Bangerter et al. |
| 2017/0159935 | A1 | 6/2017 | Drake et al. |
| 2017/0176005 | A1 | 6/2017 | Rimmer et al. |
| 2017/0184306 | A1 | 6/2017 | Tu et al. |
| 2017/0234226 | A1* | 8/2017 | Jones ............... F23R 3/02 60/757 |
| 2017/0241643 | A1 | 8/2017 | Mulcaire et al. |
| 2017/0254538 | A1 | 9/2017 | Tu et al. |
| 2017/0268776 | A1* | 9/2017 | Willis ............... F23R 3/002 |
| 2017/0356653 | A1 | 12/2017 | Bagchi et al. |
| 2018/0231251 | A1 | 8/2018 | Burd |
| 2018/0238179 | A1 | 8/2018 | Quach et al. |
| 2018/0238545 | A1 | 8/2018 | Quach et al. |
| 2018/0238546 | A1 | 8/2018 | Quach et al. |
| 2018/0238547 | A1 | 8/2018 | Quach et al. |
| 2018/0306113 | A1 | 10/2018 | Morton et al. |
| 2018/0335211 | A1 | 11/2018 | Quach et al. |
| 2018/0363902 | A1 | 12/2018 | Peters et al. |
| 2019/0195495 | A1* | 6/2019 | Moura ............... F23R 3/002 |

FOREIGN PATENT DOCUMENTS

| | | |
|---|---|---|
| GB | 2298266 A | 8/1996 |
| GB | 2317005 A | 3/1998 |
| GB | 2355301 A | 4/2001 |
| GB | 2361304 A | 10/2001 |
| WO | 2014169127 A1 | 10/2014 |
| WO | 2015038232 A1 | 3/2015 |
| WO | 2015050879 A1 | 4/2015 |
| WO | 2015065579 A1 | 5/2015 |
| WO | 2015077600 A1 | 5/2015 |
| WO | 2015084444 A1 | 6/2015 |
| WO | 2015094430 A1 | 6/2015 |
| WO | 2015112216 A2 | 7/2015 |
| WO | 2015112220 A2 | 7/2015 |

OTHER PUBLICATIONS

European Office Action dated Nov. 4, 2019 for corresponding EP Patent Application No. 18158208.1.
European Office Action dated Oct. 11, 2019 for corresponding EP Patent Application No. 18158221.4.
U.S. Non-Final Office Action dated Nov. 26, 2019 for corresponding U.S. Appl. No. 15/440,677.
European Search Report dated Jun. 27, 2018 for corresponding European Patent Application No. 18158215.6.
European Search Report dated Jun. 25, 2018 for corresponding European Patent Application No. 18158208.1.
European Search Report dated Jul. 19, 2018 for corresponding European Patent Application No. 18162763.9.
European Search Report dated Jul. 2, 2018 for corresponding European Patent Application No. 18158221.4.
European Search Report dated Jul. 9, 2018 for corresponding European Patent Application No. 18158210.7.
European Search Report dated Jun. 25, 2018 for corresponding European Patent Application No. 18156681.1.
U.S.Non-Final Office Action dated May 14, 2019 for corresponding U.S. Appl. No. 15/440,677.
U.S.Non-Final Office Action dated Jul. 18, 2019 for corresponding U.S. Appl. No. 15/432,098.
U.S.Non-Final Office Action dated Jun. 12, 2019 for corresponding U.S. Appl. No. 15/440,739.
U.S. Final Office Action dated Mar. 11, 2020 for corresponding U.S. Appl. No. 15/440,6760.

* cited by examiner

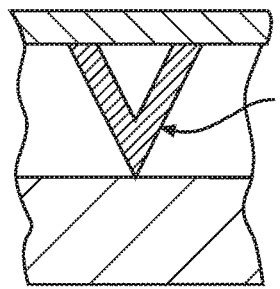
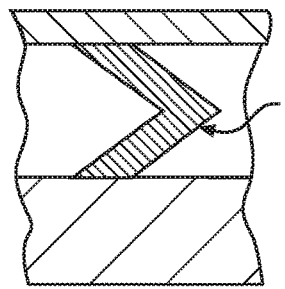
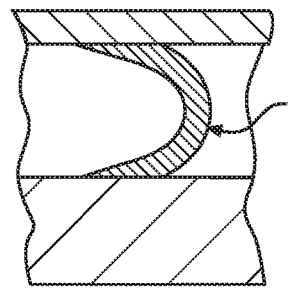
FIG. 16　　　　FIG. 17　　　　FIG. 18
FIG. 20
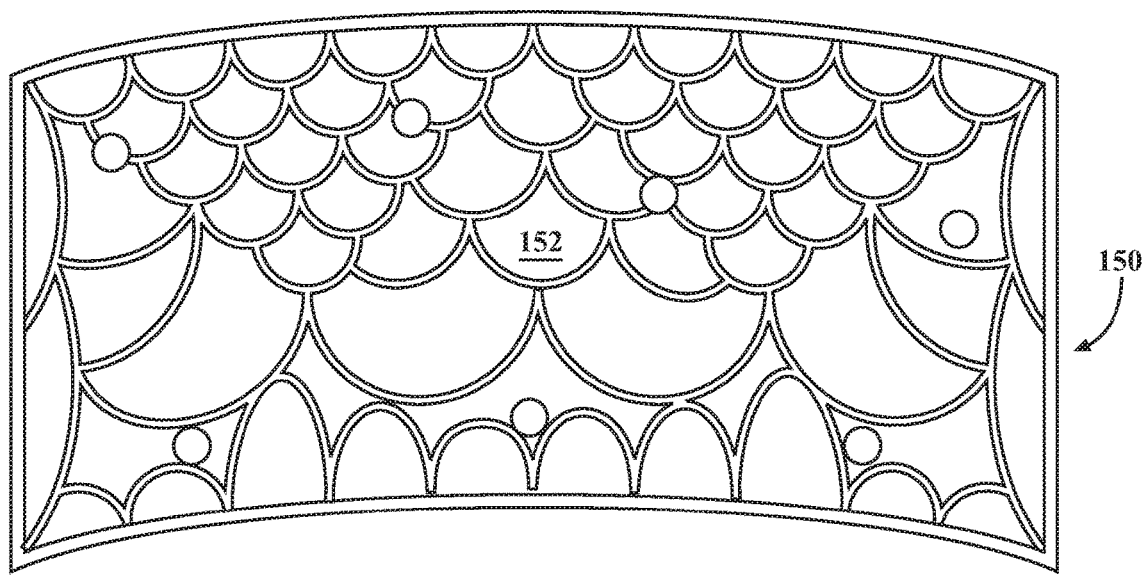

COMBUSTOR LINER WITH GASKET FOR GAS TURBINE ENGINE

BACKGROUND

The present disclosure relates to a gas turbine engine and, more particularly, to a combustor section therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, relatively high temperatures are observed in the combustor section such that cooling airflow is provided to meet desired service life requirements. Some combustor sections may include a combustion chamber formed by an inner and outer wall assembly. Each wall assembly may include a support shell lined with heat shields often referred to as liner panels. Combustor panels are often employed in modern annular gas turbine combustors to form the inner flow path. The panels are part of a two-wall liner and are exposed to a thermally challenging environment. The temperatures in the combustor often may exceed the temperature of the base metal so liner panels accommodate cooling holes through the hot exposed surface of the liner panel. These are small and angled to provide effective film cooling. The outer wall of the combustor or shell may also include impingement cooling holes that introduce cooling air jets onto a back surface of the liner panels.

In a typical combustor chamber design, the liner panels have a hot side exposed to the gas path and are cooled with cooling air that impinges onto a cold side of the panels from holes in the support shell, which is then subsequently effused through the panels to provide additional cooling effectiveness. Further, the cooling air effusing through the panel is intended to form a film of air on the panel surface, to insulate the hot side of the panel from the hot gases in the gas path.

The opposite, or cold side, has features such as cast-in threaded studs to mount the liner panel and a full perimeter rail that contacts the surface of the support shell to provide a seal for the impingement air, and thus maintain the desired pressure drop which drives the effusion of air through the panel. Current double wall panels or liners have a limited number of plenums formed by rails to contain the flow, often only one per panel. In some instances, loss of a portion of the perimeter rail, or other features or portions of the panel, such as by burn through, results in a breach. Once an impingement/effusion combustor double wall panel or liner has been breached, the air designed to pass through the effusion holes in the panel or liner instead rushes through the burn through and reduces effusion cooling. This reduction in effusion cooling and the accompanying film, may cause the liner to significantly increase in temperature, which may lead to further rapid burn degeneration of the liner panel.

SUMMARY

A gasket for a cavity within a combustor wall assembly between a support shell and a liner panel, the support shell having a multiple of impingement holes, and the liner panel having a multiple of film holes, wherein the gasket according to one disclosed non-limiting embodiment of the present disclosure includes a lattice structure that defines a multiple of cells arranged with respect to the multiple of impingement holes and the multiple of film holes such that at least one of the multiple of cells segregates a respective subset of the multiple of impingement holes and a subset of the multiple of film holes.

A further embodiment of the present disclosure may include that the gasket is additively manufactured.

A further embodiment of the present disclosure may include that the gasket has a cross-sectional shape to form a line contact with the support shell.

A further embodiment of the present disclosure may include that the gasket has a cross-sectional shape to form a line contact with the liner panel.

A further embodiment of the present disclosure may include that a first of the multiple of cells is arranged with respect to a second of the multiple of cells such that the first of the multiple of cells contains a pressure different than the second of the multiple of cells.

A further embodiment of the present disclosure may include that the pressure within each of the multiple of cells is defined by a ratio of a number of the multiple of impingement holes to a number of the multiple of film holes per cell of the multiple of cells.

A further embodiment of the present disclosure may include a crenellation between at least two of the multiple of cells.

A further embodiment of the present disclosure may include that the gasket interfaces with at least one feature that extends from a cold side of the liner panel A combustor wall assembly for a combustor for a gas turbine engine, the combustor wall assembly according to one disclosed non-limiting embodiment of the present disclosure can include a support shell with a multiple of impingement holes; a liner panel with a multiple of film holes, the liner panel mounted to the support shell via a multiple of studs that extend from a cold side of the liner panel, the liner panel including a periphery rail that extends from the cold side of the liner panel to interface with the support shell; and a gasket between the support shell and the liner panel.

A further embodiment of the present disclosure may include that the gasket is engaged with at least one of the multiple of studs.

A further embodiment of the present disclosure may include that the gasket includes a lattice structure that forms a multiple of cells between the support shell and the liner panel.

A further embodiment of the present disclosure may include that the multiple of cells are arranged with respect to a multiple of impingement holes in the support shell and a multiple of film holes in the liner panel.

A further embodiment of the present disclosure may include that a first of the multiple of cells contains a pressure different than a second of the multiple of cells.

A further embodiment of the present disclosure may include that the pressure is defined by a ratio of a number of the multiple of impingement holes to a number of the multiple of film holes per cell.

A further embodiment of the present disclosure may include a hole between at least two of the multiple of cells.

A further embodiment of the present disclosure may include wherein the gasket interfaces with a stud that extends from the liner panel.

A method of manufacturing a combustor wall assembly of a gas turbine engine, according to one disclosed non-limiting embodiment of the present disclosure can include trapping a gasket between a support shell and a liner panel to form a multiple of cells arranged with respect to a multiple of impingement holes in the support shell and a multiple of film holes in the liner panel wherein each of the multiple of cells segregates a respective subset of the multiple of impingement holes and a subset of the multiple of film holes.

A further embodiment of the present disclosure may include forming a line contact between a cross-sectional shape of the gasket and at least one of the support shell and the liner panel.

A further embodiment of the present disclosure may include interfacing the gasket with a stud that extends from a cold side of the liner panel.

A further embodiment of the present disclosure may include locating the gasket within a periphery rail that extends from a cold side of the liner panel.

The foregoing features and elements may be combined in various combinations without exclusivity, unless expressly indicated otherwise. These features and elements as well as the operation of the invention will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 16 is a sectional view of a combustor wall gasket according to another embodiment;

FIG. 17 is a sectional view of a combustor wall gasket according to another embodiment;

FIG. 18 is a sectional view of a combustor wall gasket according to another embodiment;

FIG. 20 is a plan view of a combustor wall gasket according to another embodiment.

DETAILED DESCRIPTION

Figure 1:
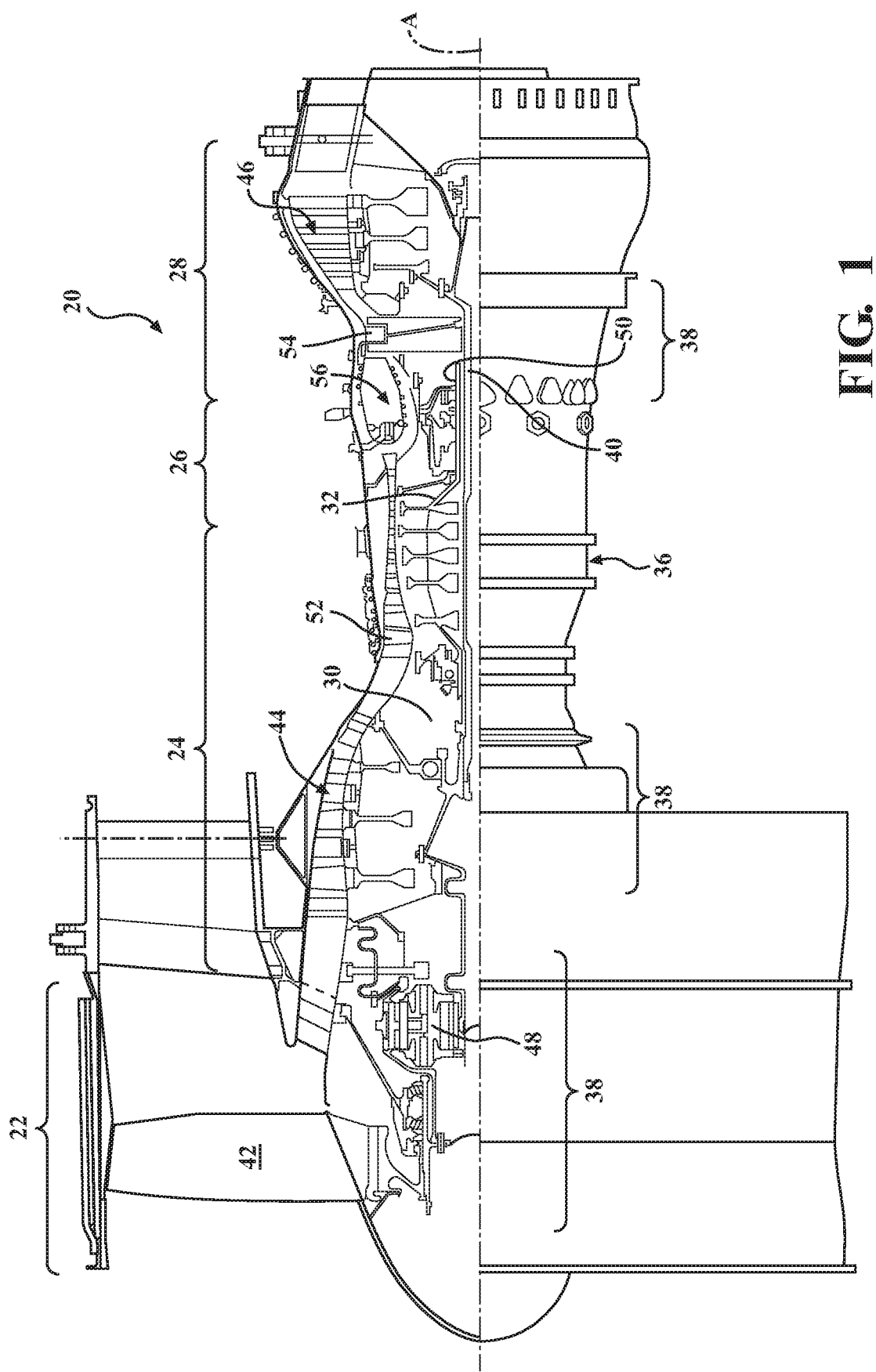
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engine architectures 200 might include an augmentor section among other systems or features. The fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be appreciated that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an intermediate pressure turbine ("IPT") between the high pressure turbine ("HPT") and the Low pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44, then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example, is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be appreciated, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet (10668 m). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 2:
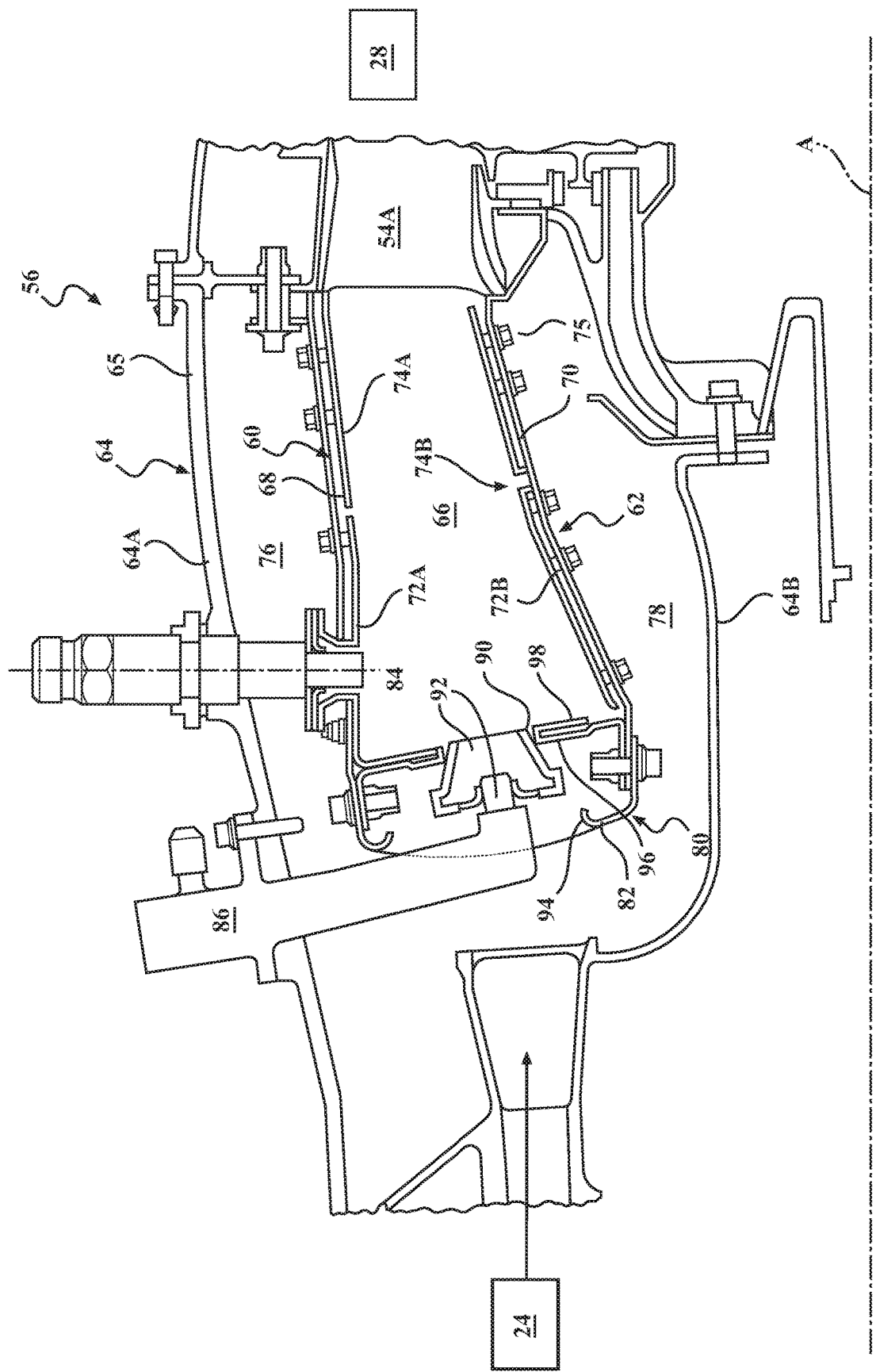
FIG. 2 is an expanded longitudinal schematic sectional view of a combustor section according to one non-limiting embodiment that may be used with the example gas turbine engine architectures.

With reference to FIG. 2, the combustor section 26 generally includes a combustor 56 with an outer combustor wall assembly 60, an inner combustor wall assembly 62, and a diffuser case module 64. The outer combustor wall assembly 60 and the inner combustor wall assembly 62 are spaced apart such that a combustion chamber 66 is defined there between. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be appreciated that although a particular combustor is illustrated, other combustor types with various combustor liner arrangements will also benefit herefrom. It should be further appreciated that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72, 74 mounted thereto arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other high temperature materials such as Ceramic Matrix Composite.

In one disclosed non-limiting embodiment, the liner array includes a multiple of forward liner panels 72A, 72B and a multiple of aft liner panels 74A, 74B that are circumferentially staggered to line the outer shell 68. The multiple of forward liner panels 72A, 72B and a multiple of aft liner panels 74A, 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forward most ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
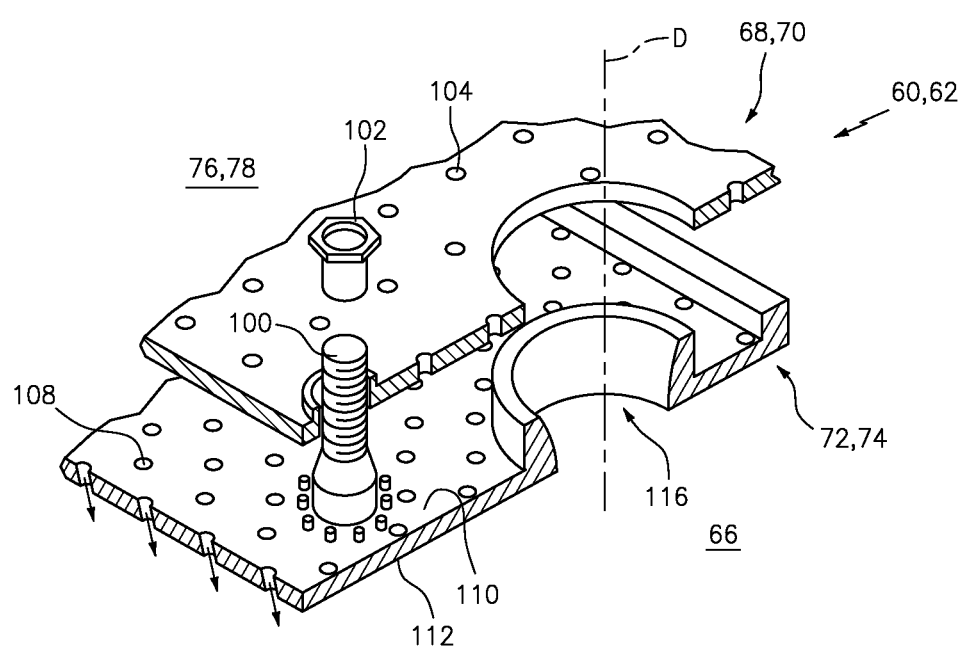
FIG. 3 is an exploded partial sectional view of a portion of a combustor wall assembly.

With reference to FIG. 3, a multiple of studs 100 extend from each of the liner panels 72, 74 so as to permit a liner array (partially shown in FIG. 4) of the liner panels 72, 74 to be mounted to their respective support shells 68, 70 with fasteners 102 such as nuts. That is, the studs 100 project rigidly from the liner panels 72, 74 to extend through the respective support shells 68, 70 and receive the fasteners 102 on a threaded section thereof (FIG. 5).

A multiple of impingement holes 104 penetrate through the support shells 68, 70 to allow air from the respective annular plenums 76, 78 to enter cavities 106 formed in the combustor walls 60, 62 between the respective support shells 68, 70 and liner panels 72, 74. The impingement holes 104 are generally normal to the surface of the liner panels 72, 74. The air in the cavities 106 provides cold side impingement cooling of the liner panels 72, 74 that is generally defined herein as heat removal via internal convection.

A multiple of film holes 108 penetrate through each of the liner panels 72, 74. The geometry of the holes, e.g., diameter, shape, density, surface angle, incidence angle, etc., as well as the location of the holes with respect to the high temperature combustion flow also contributes to effusion cooling. The film holes 108 allow the air to pass from the cavities 106 defined in part by a cold side 110 of the liner panels 72, 74 to a hot side 112 of the liner panels 72, 74 and thereby facilitate the formation of a thin, relatively cool, film of cooling air along the hot side 112.

Figure 6:
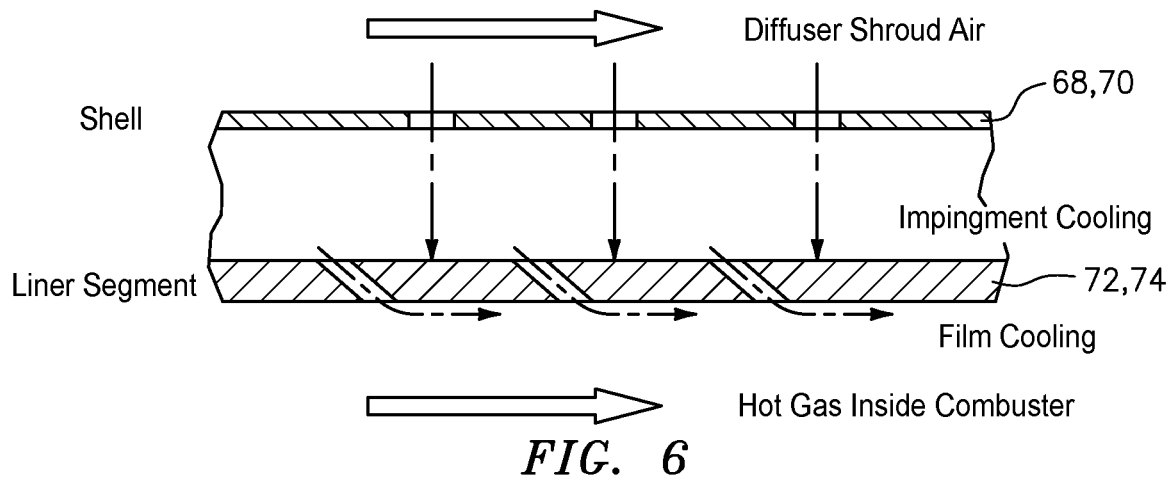
FIG. 6 is a sectional view of a portion of a combustor wall assembly.

In one disclosed non-limiting embodiment, each of the multiple of film holes 108 may define a surface angle with respect to the cold side 110 of the liner panels 72, 74. The film holes 108 are generally more numerous than the impingement holes 104 and promote film cooling along the hot side 112 to sheath the liner panels 72, 74 (FIG. 6). Film cooling as defined herein is the introduction of a relatively cooler air at one or more discrete locations along a surface exposed to a high temperature environment to protect that surface in the region of the air injection as well as downstream thereof.

The combination of impingement holes 104 and film holes 108 may be referred to as an Impingement Film Float wall (IFF) assembly. A multiple of dilution holes 116 are located in the liner panels 72, 74 each along a common axis D. For example, only, the dilution holes 116 are located in a circumferential line W (shown partially in FIG. 4). Although the dilution holes 116 are illustrated in the disclosed non-limiting embodiment as within the aft liner panels 74A, 74B, the dilution holes may alternatively be located in the forward liner panels 72A, 72B or in a single liner panel which replaces the fore/aft liner panel array. Further, the dilution holes 116 although illustrated in the disclosed non-limiting embodiment as integrally formed in the liner panels, it should be appreciated that the dilution holes 116 may be separate components. Whether integrally formed or separate components, the dilution holes 116 may be referred to as grommets.

Figure 4:
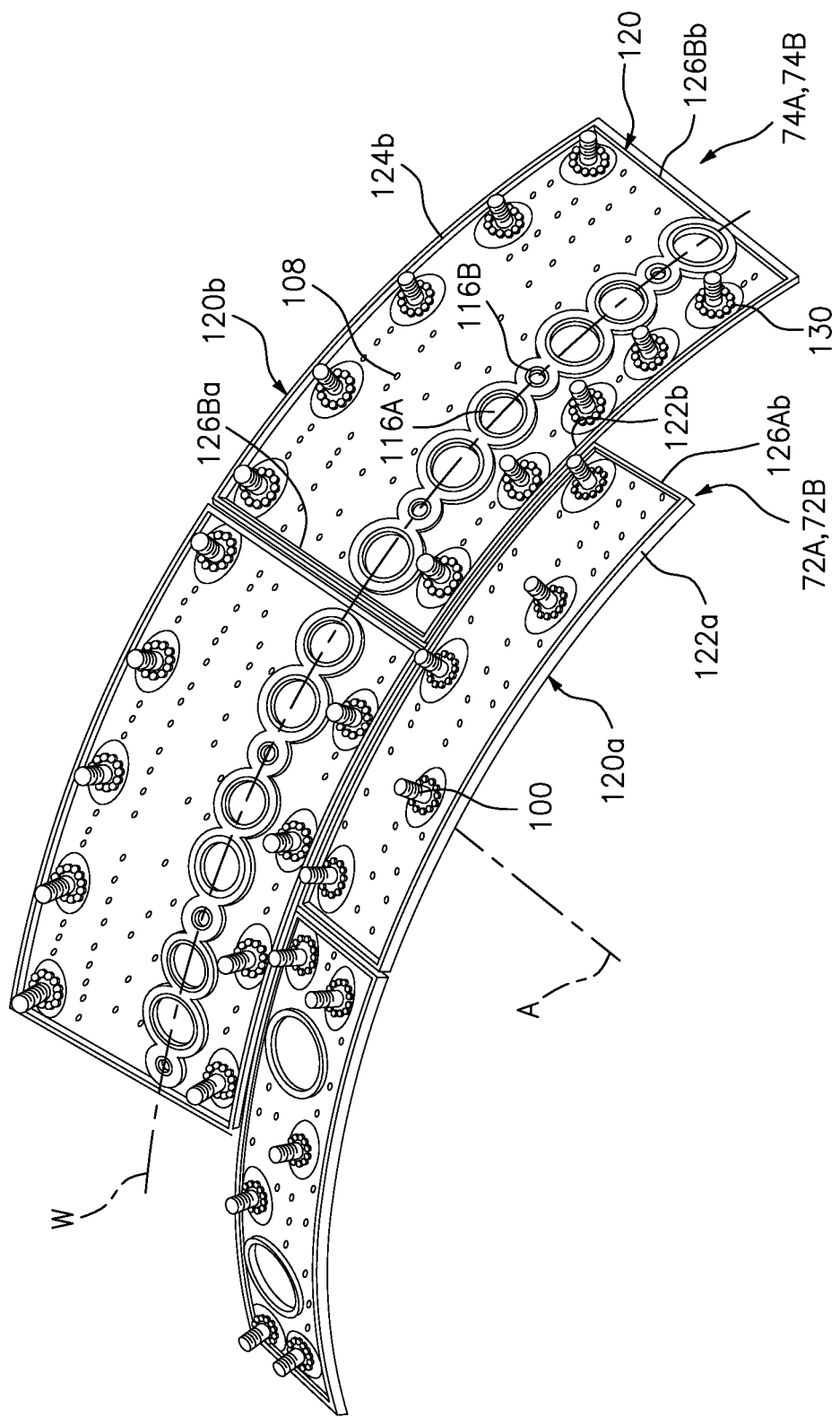
FIG. 4 is a perspective cold side view of a portion of a liner panel array.
Figure 5:
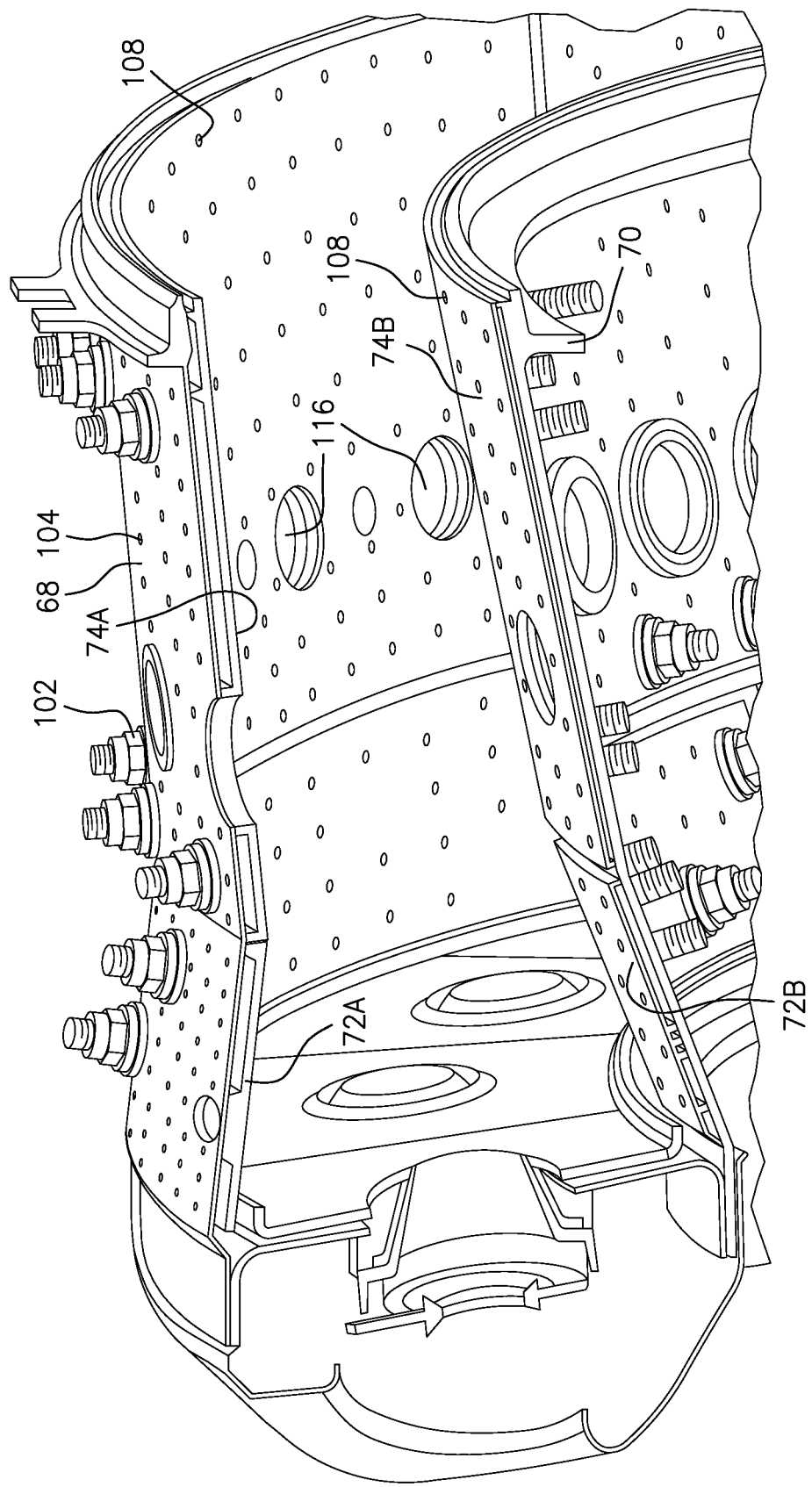
FIG. 5 is a perspective partial sectional view of a combustor.

With reference to FIG. 4, in one disclosed non-limiting embodiment, each of the forward liner panels 72A, 72B, and the aft liner panels 74A, 74B in the liner panel array includes a perimeter rail 120a, 120b formed by a forward circumferential rail 122a, 122b, an aft circumferential rail 124a, 124b, and axial rails 126Aa 126Ab, 126Ba, 126Bb, that interconnect the forward and aft circumferential rail 122a, 122b, 124a, 124b. The perimeter rail 120 seals each liner panel with respect to the respective support shell 68, 70 to form the impingement cavity 106 there between. That is, the forward and aft circumferential rail 122a, 122b, 124a, 124b are located at relatively constant curvature shell interfaces while the axial rails 126Aa 126Ab, 126Ba, 126Bb, extend across an axial length of the respective support shell 68, 70 to complete the perimeter rail 120a, 120b that seals the forward liner panels 72A, 72B, and the aft liner panels 74A, 74B to the respective support shell 68, 70.

A multiple of studs 100 are located adjacent to the respective forward and aft circumferential rail 122a, 122b, 124a, 124b. Each of the studs 100 may be at least partially surrounded by posts 130 to at least partially support the fastener 102 and provide a stand-off between each forward liner panels 72A, 72B, and the aft liner panels 74A, 74B and respective support shell 68, 70.

The dilution holes 116 are located downstream of the forward circumferential rail 122a, 122b in the aft liner panels 74A, 74B to quench the hot combustion gases within the combustion chamber 66 by direct supply of cooling air from the respective annular plenums 76, 78. That is, the dilution holes 116 pass air at the pressure outside the combustion chamber 66 directly into the combustion chamber 66.

This dilution air is not primarily used for cooling of the metal surfaces of the combustor shells or panels, but to condition the combustion products within the combustion chamber 66. In this disclosed non-limiting embodiment, the dilution holes 116 include at least one set of circumferentially alternating major dilution holes 116A and minor dilution holes 116B. That is, in some circumferentially offset locations, two major dilution holes 116A are separated by one minor dilution holes 116B. Here, every two major dilution holes 116A are separated by one minor dilution holes 116B but may still be considered "circumferentially alternating" as described herein.

Figure 7:
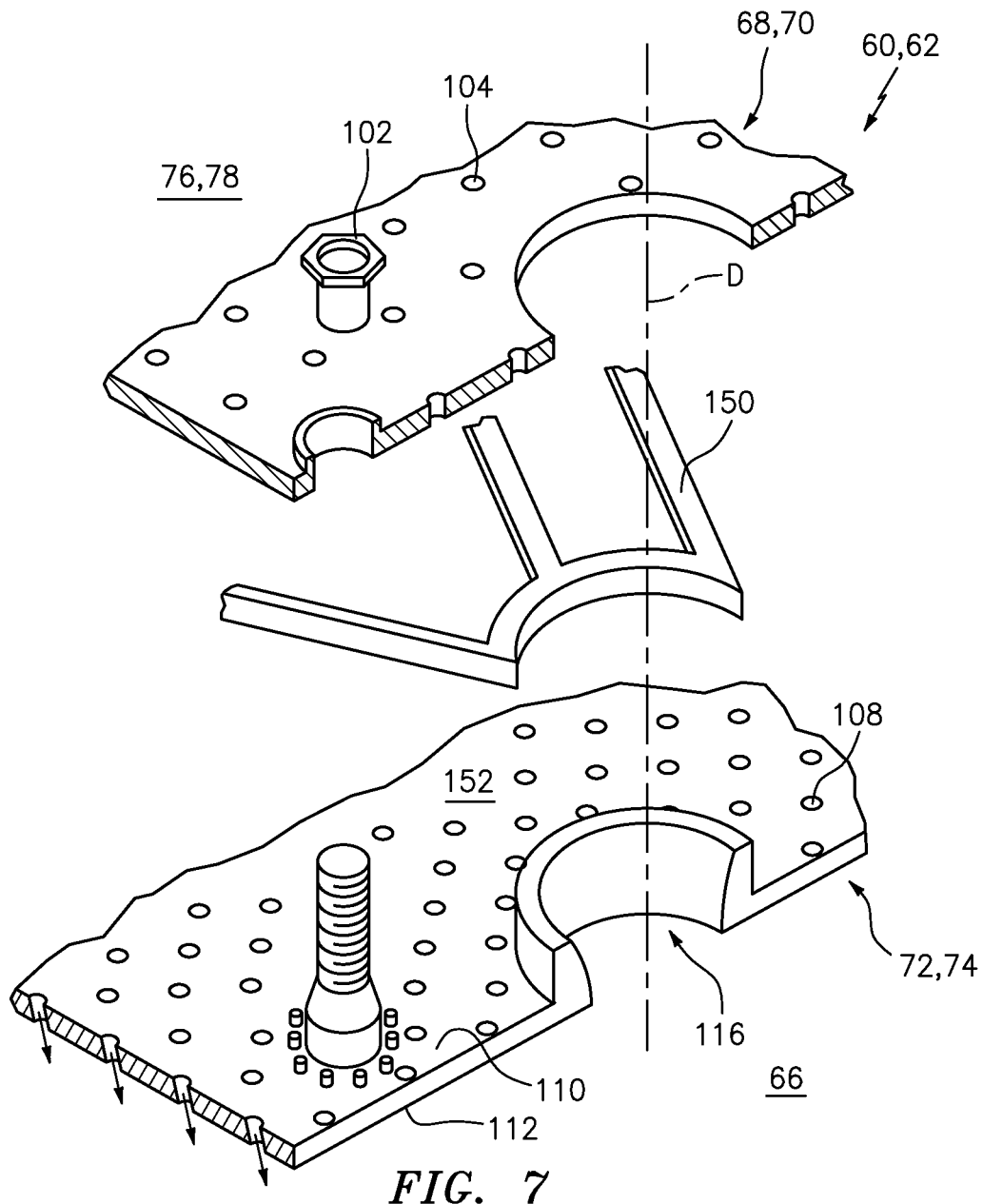
FIG. 7 is a sectional view of a combustor wall assembly with a discontinuous rail end surface according to one embodiment.
Figure 8:
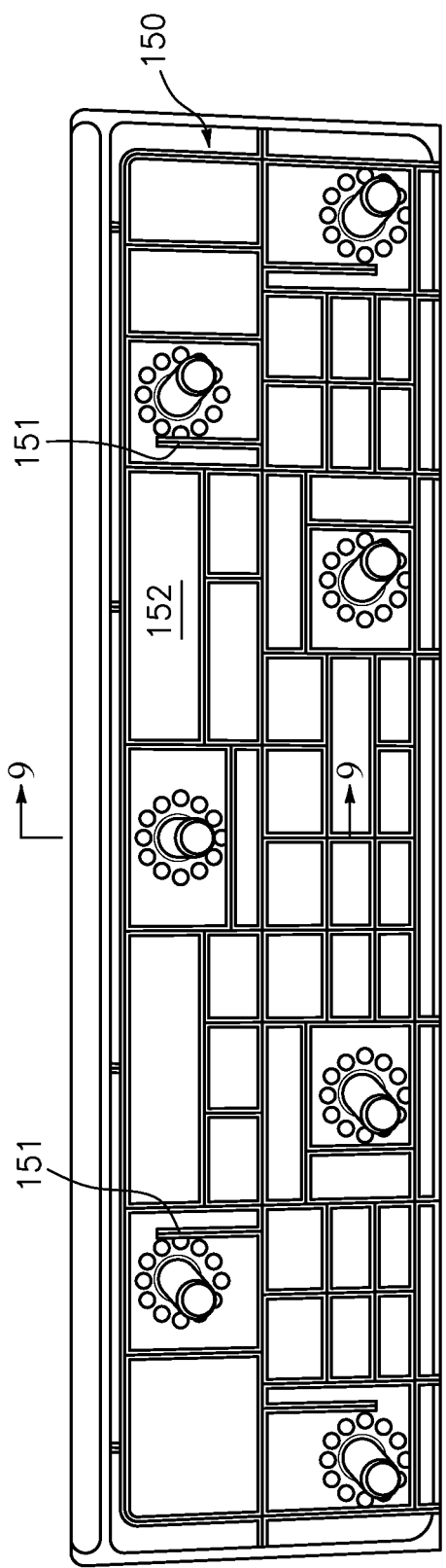
FIG. 8 is a plan view of a combustor wall gasket according to one embodiment.

With reference to FIG. 7, a gasket 150 is located between the cold side 110 of each liner panel 72, 74 and the respective support shells 68, 70. The gasket 150 may be additively manufactured or otherwise configured to define a multiple of cells 152 (FIG. 8). The cells 152 are essentially formed by a lattice structure of the gasket 150. Although a particular cell configuration is illustrated, it should be appreciated that various configurations will benefit herefrom.

The multiple of cells 152 may be sized and arranged to match the density of the multiple of impingement holes 104 through the support shells 68, 70 and the multiple of film holes 108 that penetrate through each of the liner panels 72, 74. The multiple of cells 152 may also be sized and arranged to possible damage locations.

In one specific example, each of the multiple of cells 152 may be arranged with respect to a subset of the multiple of impingement holes 104 through the support shells 68, 70 and a subset of the multiple of film holes 108 that penetrate through each of the liner panels 72, 74 to define a desired pressure within each cell 152. That is, the ratio of the number of impingement holes 104 and the number of film holes 108 for each cell 152 may be utilized to control the pressure within each of the associated cells 152. The pressure within each cell 152 may be specifically tailored over a designated area as the number of impingement holes 104 and the number of film holes 108 may be different for each cell 152. Further, the subset of the multiple of impingement holes 104 and the subset of the multiple of film holes 108 from one cell 152 to another to specifically tailor the cooling over a designated area such that the thermal properties may be specifically tailored within each liner panel 72, 74.

The gasket 150 may be located within the perimeter rail 120 and engage or otherwise interface with at least one support stud 100. Gasket features 151 (FIG. 8) such as standoffs may be utilized to facilitate a "snap fit" to the rails 120, stand-offs and/or studs 100 in order to facilitate assembly. Alternatively, the gasket 150 can be fabricated and brazed to the associated support shells 68, 70, or the liner panels 72, 74 to form the cells 152 when the liner panels 72,74 are mounted to the respective support shells 68, 70.

Since the gasket 150 need not be structural, the gasket 150 is readily additively manufactured. Alternatively, the gasket 150 may be manufactured via chemical etching, stamping, or other methods.

Figure 10:
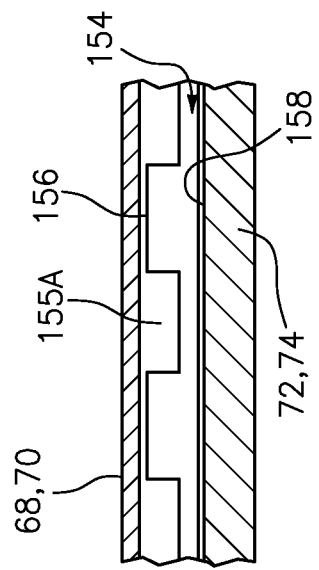
FIG. 10 is a side view of a combustor wall gasket with a crenellation according to one embodiment.
Figure 11:
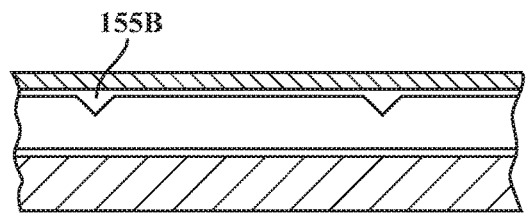
FIG. 11 is a side view of a combustor wall gasket with a notch according to one embodiment.
Figure 12:
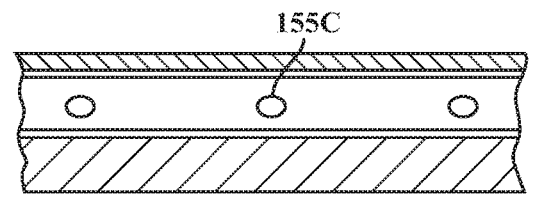
FIG. 12 is a side view of a combustor wall gasket with a hole according to one embodiment.

The cells 152 of the gasket 150 are formed by a lattice structure 154 that spans the cavities 106 formed in the combustor walls 60, 62 between the respective support shells 68, 70 and liner panels 72, 74. The lattice structure 154 may further include crenellations 155A (FIG. 10), notches 155B (FIG. 11), or other non-continuous surfaces on an upper surface 156 adjacent to the shells 68, 70, and/or a lower surface 158 adjacent to the liner panels 72, 74 to permit pressure balance between two or more cells 152 and allow limited cooling airflow redistribution. Holes and/or holes 155C (FIG. 12) of various shapes and configurations completely contained within the gasket rail may also be used to this effect.

Figure 9:
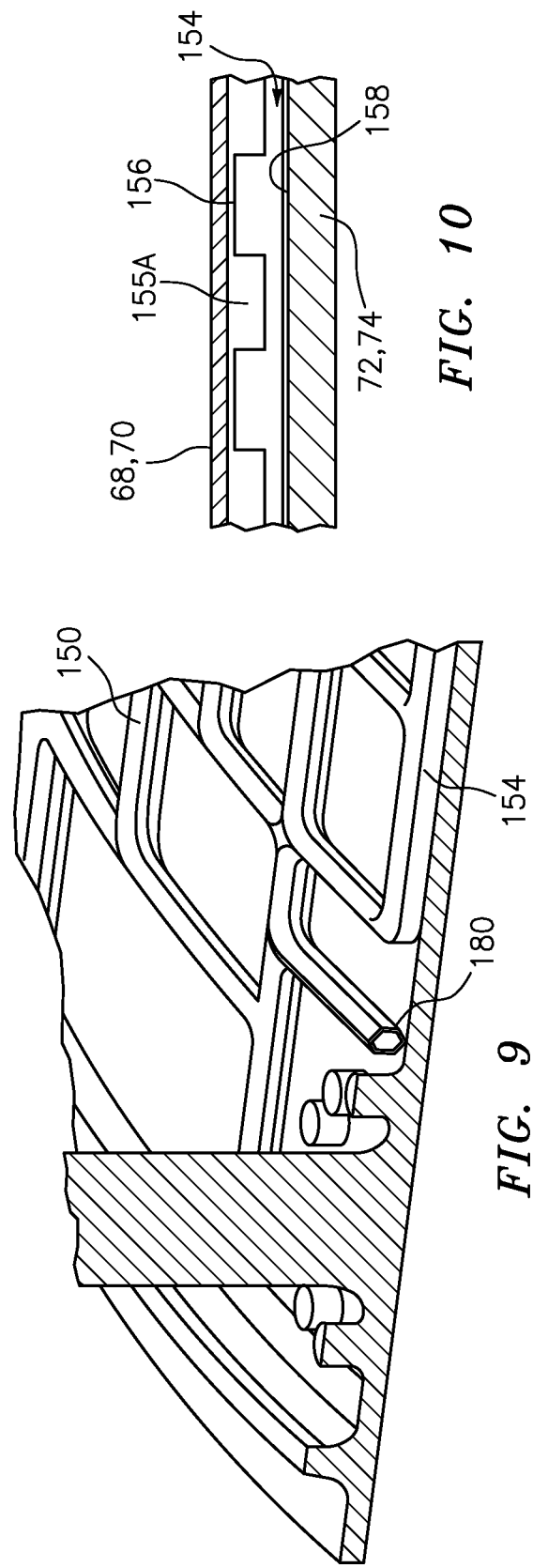
FIG. 9 is a sectional view of the combustor wall gasket of FIG. 8.
Figure 13:
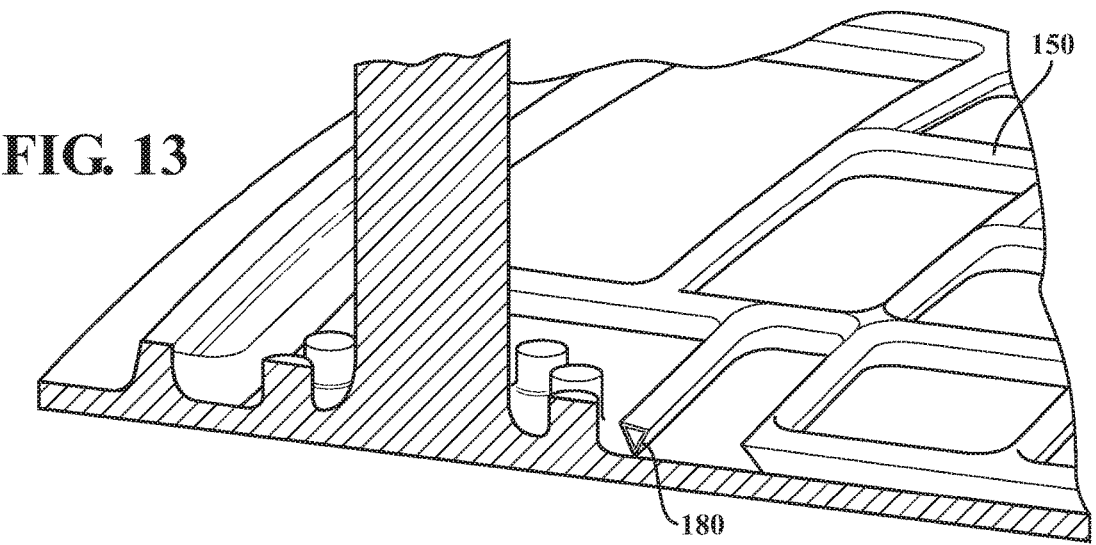
FIG. 13 is a sectional view of a combustor wall gasket according to another embodiment.
Figure 14:
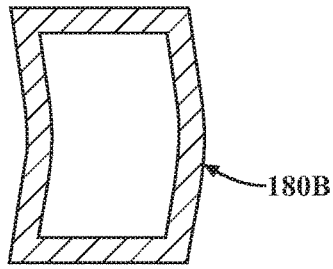
FIG. 14 is a sectional view of a combustor wall gasket according to another embodiment.
Figure 15:
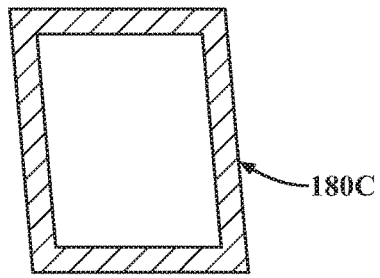
FIG. 15 is a sectional view of a combustor wall gasket according to another embodiment.

The cross-sectional shape of the lattice structure 154 may be shaped to facilitate sealing via, for example, a diamond cross-sectional shape 180 (FIG. 9), a triangular cross-sectional shape 180A (FIG. 13), or other cross-sectional shape. The cross-sectional shape facilities formation of a line contact with the shells 68, 70 and/or the liner panel 72, 74. As the material of the shells 68, 70 is relatively thin, the knife-edge type line contact facilitates an effective seal there between as well as minimizes cooling flow blockage. Other cross-sectional shapes such as a shifted rectangular shape 180B (FIG. 14), a rectangular shape 180C (FIG. 15), a chevron shape 180D, 180E (FIGS. 16 and 17), a crescent shape 180F. The cross sections can be hollow or partial hollow to allow the movement of air, and/or can include portions that are compliant in order to promote sealing between the liner panels 72, 74 and the shells 68, 70.

Figure 19:
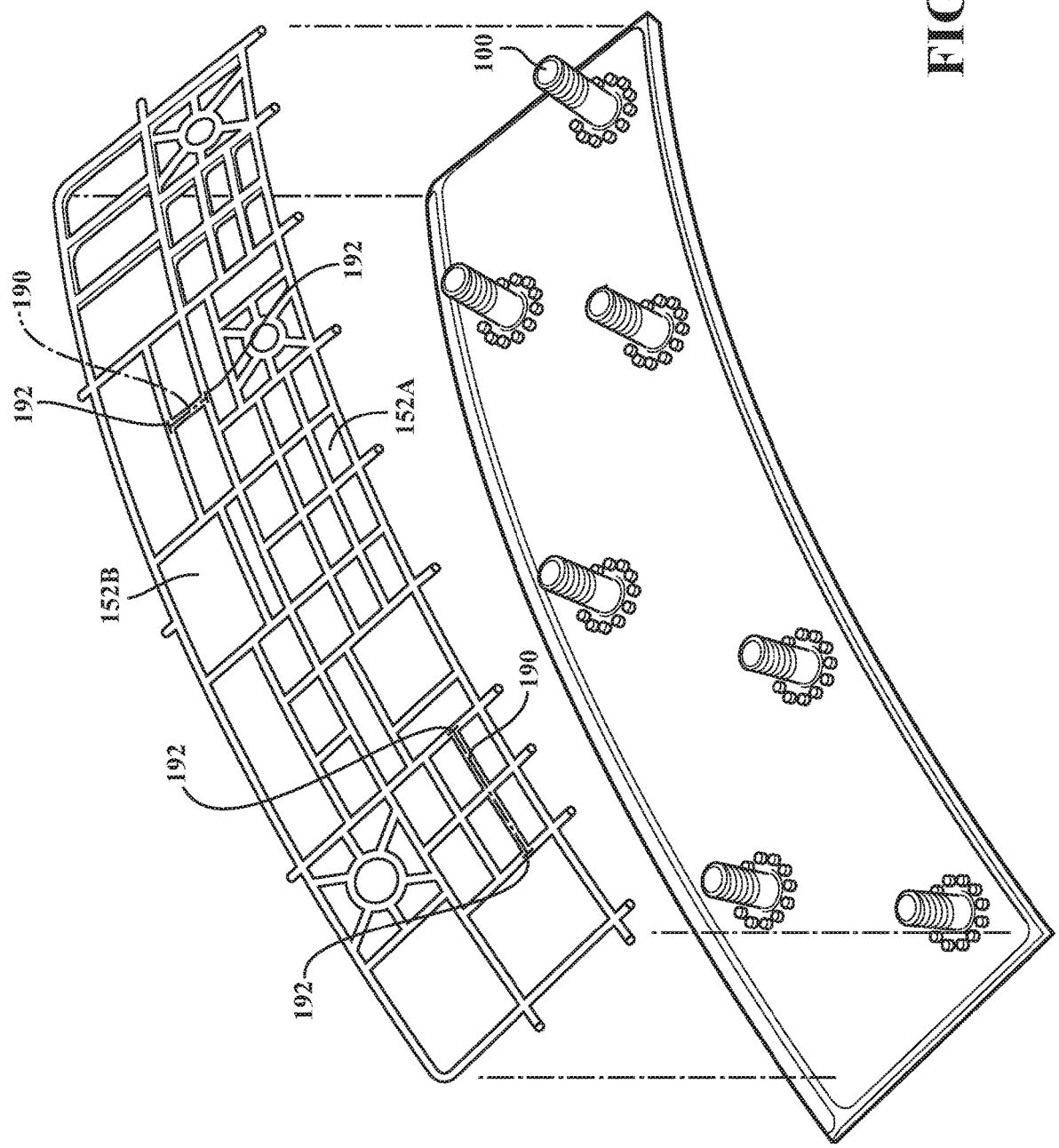
FIG. 19 is a plan view of a combustor wall gasket with internal holes according to another embodiment.

With reference to FIG. 19, the lattice structure 154 may be hollow or include one or more hollow holes 190 to permit equalization of pressure between two or more cells 152A, 152B that may not be adjacent. The hollow holes 190 may communicate through key-hole apertures 192 with the associated cells 152A, 152B.

As the gasket 150 is trapped between the cold side 110 of each liner panel 72, 74 and the respective support shells 68, 70, the gasket 150 may move with respect to the liner panel 72, 74 and the respective support shells 68, 70 to accommodate thermal excursions.

Alternatively, the gasket 150 may include non-rectilinear cells such as arcuate, or fish-scale type configurations (FIG. 20). That is, various plenum shapes are readily defined by the gasket 150.

The multiple of cells 152 of the gasket 150 facilitate a reduction and restriction of any burn though area. For once the initial burn through occurs, the neighboring area of the panel would continue to be provided with effusion air, such that the adjoining surfaces remain cool. If the area of the burn through is sufficiently restricted, the combustor remains effective without the necessity of panel replacement. As the gasket 150 is non-structural, the gasket 150 is readily retrofit to conventional systems without change to castings, drilling, or re-certification.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

The invention claimed is:

1. A combustor wall assembly for a combustor of a gas turbine engine, the combustor wall assembly comprising:
   a support shell with a multiple of impingement holes;
   a liner panel with a multiple of film holes, the liner panel mounted to the support shell via a multiple of studs that extend from a cold side of the liner panel, the liner panel including a periphery rail that extends from the cold side of the liner panel to interface with the support shell; and
   a gasket located within the periphery rail between the support shell and the liner panel, the gasket comprising a lattice structure that spans a cavity defined between the support shell and the liner panel to define a multiple of cells between the support shell and the liner panel, wherein the gasket is trapped between the liner panel and the support shell such that the gasket is movable with respect to the liner panel and the support shell to accommodate thermal excursions, and wherein each cell of the multiple of cells is defined at a perimeter by walls of the gasket, and by the support shell and the liner panel on opposite faces.

2. The combustor wall assembly as recited in claim 1, wherein the gasket is engaged with at least one of the multiple of studs.

3. The combustor wall assembly as recited in claim 1, wherein each cell of the multiple of cells is arranged to enclose the multiple of impingement holes in the support shell and the multiple of film holes in the liner panel.

4. The combustor wall assembly as recited in claim 3, wherein a first of the multiple of cells contains a pressure different than a pressure within a second of the multiple of cells.

5. The combustor wall assembly as recited in claim 4, wherein a ratio of a number of the multiple of impingement holes to a number of the multiple of film holes per cell is selected to produce a desired pressure in each cell of the multiple of cells.

6. The combustor wall assembly as recited in claim 5, further comprising a hole between at least two of the multiple of cells.

7. The combustor wall assembly as recited in claim 1, wherein the gasket interfaces with at least one stud of the multiple of studs that extends from the liner panel.

8. The combustor wall assembly as recited in claim 1, wherein the gasket comprises standoffs to facilitate a "snap fit" to the liner panel.

9. The combustor wall assembly as recited in claim 1, wherein the gasket has a cross-sectional shape having an upper and a lower point such that contact of the gasket with at least one of the liner panel and the support shell is line contact.

* * * * *